United States Patent [19]
Ashton

[11] Patent Number: 5,871,061
[45] Date of Patent: Feb. 16, 1999

[54] HOVERCRAFT LOAD TRANSPORTING APPARATUS

[76] Inventor: Douglas W. Ashton, 3917 N. Point Blvd., Dundalk, Md. 21222

[21] Appl. No.: 724,091

[22] Filed: Sep. 30, 1996

[51] Int. Cl.⁶ .................................................. B60V 1/00
[52] U.S. Cl. ............................................. 180/116; 180/117
[58] Field of Search .................................. 180/116, 117; 280/47.31

[56] References Cited

U.S. PATENT DOCUMENTS 3,208,543  9/1965  Crowley ................................. 180/116

FOREIGN PATENT DOCUMENTS

| 712020 | 6/1965 | Canada | 180/116 |
|---|---|---|---|
| 2112904 | 10/1971 | Germany | 180/116 |
| 5178205 | 7/1993 | Japan | 180/116 |
| 1317422 | 5/1973 | United Kingdom | 180/116 |
| 1353585 | 5/1974 | United Kingdom | 180/116 |

*Primary Examiner*—Daniel G. DePumpo
*Attorney, Agent, or Firm*—Law Offices of Royal W. Craig

[57] ABSTRACT

The present invention is for a hovercraft load transport assembly which incorporates an air cushion assembly having a fan powered by an engine. The fan draws air into the device downwardly to fill the neoprene skirt of the device. This causes the device to essentially "float" above the ground on a cushion of air. The neoprene skirt is supported on a metal frame. In one embodiment, optional thrust tubes at the back of the device allow for directional movement. Thrust and throttle controls allow for variance in the lift, speed and movement of the device. There is also a load carrying and dumping receptacle which is hydraulically actuated.

9 Claims, 2 Drawing Sheets

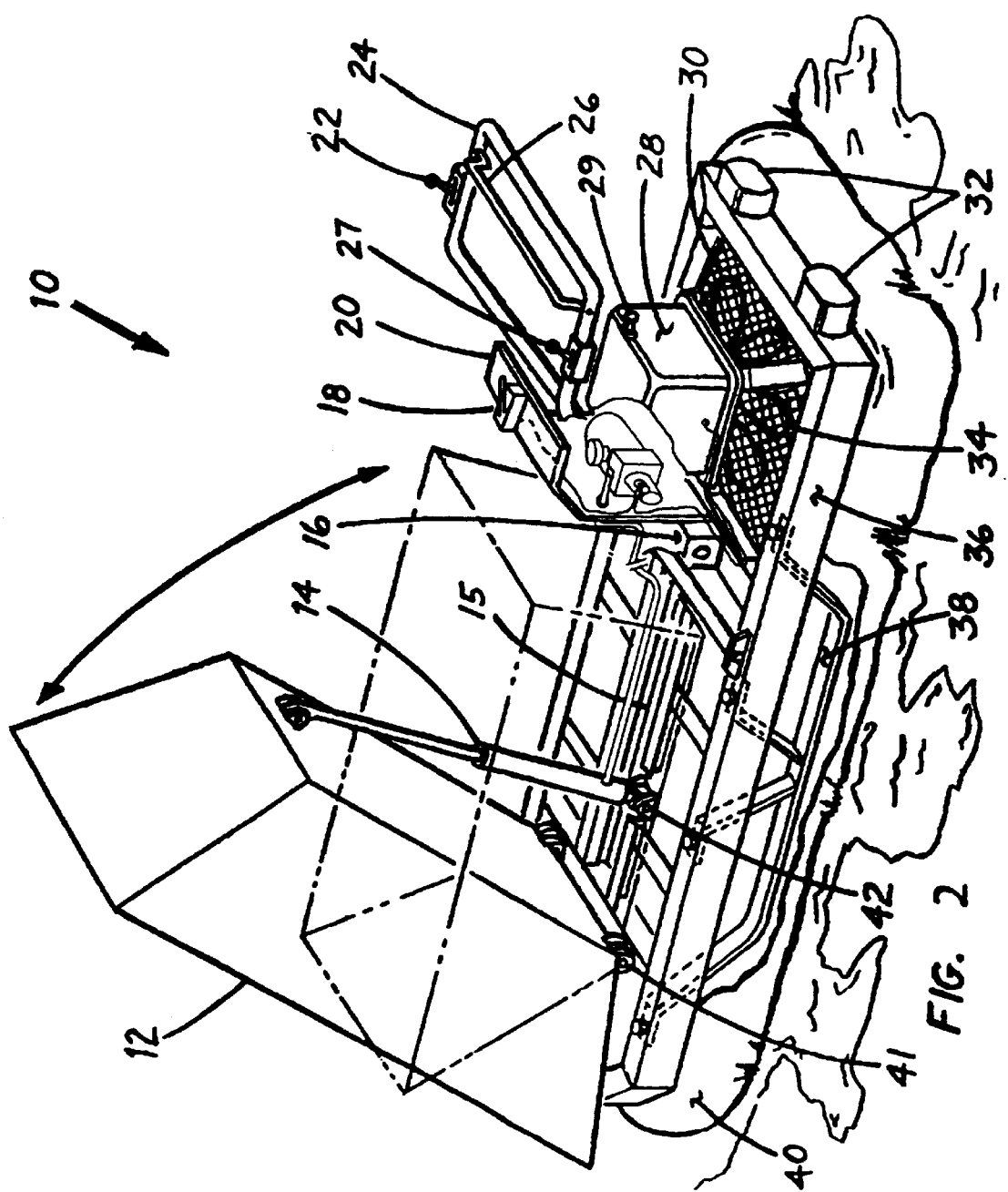

HOVERCRAFT LOAD TRANSPORTING APPARATUS

BACKGROUND OF THE INVENTION

The present invention relates to load transporting devices such as wheel barrows, and more particularly to wheel barrow which float on an air cushion during operation.

Apparatus for moving and transporting loads over short distances are well known in the art. Typically, wheel barrows have a load carrying and dumping receptacle which is supported by one or more wheels at the front and legs at the back in the loading position. For transport, the user stands behind the wheel barrow and lifts the device by the handles. When lifted, the load carrying and dumping receptacle is tilted forward at an angle on the wheel. Therefore, the load is shifted such that wheel bears the brunt of the weight of the load. For hard surfaces such as cement or blacktop, the wheel barrow described above works well.

However, on soft surfaces such as grass or dirt, particularly when the ground is wet, wheel barrows can be difficult to maneuver and often make deep tracks and troughs in the ground, tearing up the grass and dirt. Additionally, traditional wheel barrows only have forwards and backwards movement, and attempting to turn a wheel barrow with a heavy load balanced on one wheel can be very difficult. Dumping heavy load can also be a problem with a traditional wheel barrow in that the user must tilt the wheel barrow upwards by the handles in order the empty the receptacle.

Therefore, there is a need for a wheel barrow which can be easily maneuvered over all surfaces. There is also a need for a wheel barrow which will not tear up lawns or leave tracks or troughs. Moreover, there is a need for a wheel barrow which can be easily maneuvered in all directions and its contents easily dumped.

SUMMARY OF THE INVENTION

The present invention is for a hovercraft load transport assembly which satisfies these needs. The present invention incorporates an air cushion assembly having a fan powered by an engine. The fan draws air into the device downwardly to fill the neoprene skirt of the device. This causes the device to essentially "float" above the ground on a cushion of air. The neoprene skirt is supported on a metal frame. There is also a load carrying and dumping receptacle which is hydraulically actuated. The device also would include a safety cut-off mechanism.

One embodiment of the device would provide for hover capabilities only, with all directional movement to be controlled by the user. However, optional thrust tubes can be added to the rear of the device allow for directional movement. Thrust and throttle controls would allow for variance in the speed and movement of the device.

OBJECTS OF THE INVENTION

Therefore, it is an object of this invention to provide for a device which can transport loads without causing tracks or troughs to be formed in the ground.

It is an additional object of this invention to provide for a device which can transport loads over land or water, including ice, snow, marsh land, and any other surface where ground contact would be undesirable.

It is another object of this invention to provide for a device which can transport loads which easy to maneuver and propel.

It is a further object of this invention to provide for a device which uses an air cushion to support a load to be transported.

It is yet another object of this invention to provide for a device which uses a fan to produce an air cushion to support a load during transport.

It is still a further object of this invention to provide for an air cushion device which has load carrying and dumping capabilities.

It is still yet another object of this invention to provide for an air cushion device which has a hydraulically lifted dumping carrier.

BRIEF DESCRIPTION OF THE DRAWINGS

These and other features, aspects, and advantages of the present invention will become better understood with regard to the following description, appended claims, and accompanying drawings where:

FIG. 2 is a perspective view of an alternative embodiment of the present invention in which electronic control of the hydraulic lift cylinder is accomplished manually by a hand pump.

DETAILED DESCRIPTION OF THE DRAWINGS

Figure 1:
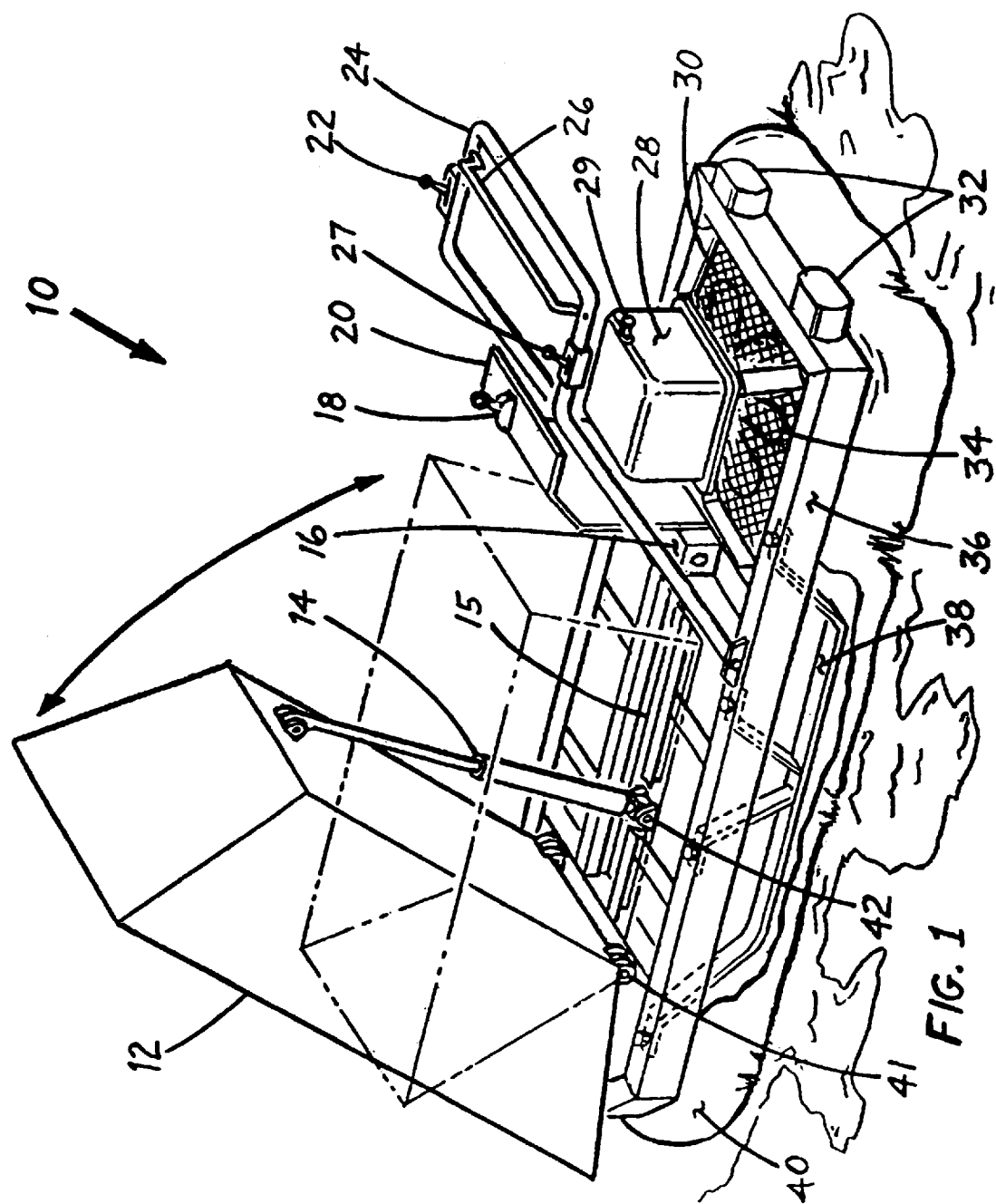
FIG. 1 is a perspective view of the present invention.

FIG. 1 illustrates the device of the present invention, a hovercraft load transport assembly 10. This is a stand-behind unit wherein the user stands in back of the device during operation.

The hovercraft assembly has a rigid frame 36 as the base which is formed of metal or hard plastic, or any other suitable rigid material. Attached to the rigid frame are the support runners 38, which support the device 10 when it is not in use. Also attached to the edges of the rigid frame 36 is the air cushion skirt 40. This skirt 40 can be made of rubber, water repellant canvas, neoprene or other heavy duty fabric.

Positioned at the rear of the device is the fan 34 which is powered by the engine 28. This can be an impeller fan, a propeller fan or any other type of fan which can provide the needed lift capabilities. The engine 28 has a pull starter 29. The engine 28 drives the fan 34 which draws air into the device 10 and fills the air cushion skirt 40. A screen 30 protects the fan from falling objects. In a second embodiment, optional directional thrust tubes 32 allow for forward motion of the device 10. There is a thrust control 27 for controlling the amount of thrust provided by the tubes 32.

The device 10 is manually propelled by a user standing in back and steering by the handle 24. There is a throttle control 22 which controls the speed of the engine 28. The safety mechanism 26 is cut-off switch which causes the engine 28 and the fan 34 to shut off when the bar 26 is released.

The hovercraft load transport assembly 10 carries loads in a carrying and dumping receptacle 12. The dumping function is performed by a hydraulic lift cylinder 14 which is activated by dump control 18. The hydraulic system can be either electrically or hand pump operated. One end of the hydraulic lift cylinder 14 is pivotally attached to and positioned within the lift cylinder pocket 15 formed in the metal frame 36. The other end of the hydraulic lift cylinder 14 is pivotally attached to the carrying and dumping receptacle 12. The hydraulic fluid reservoir 16 is positioned behind the dumping container 12 and in front of the dump switch platform 20.

When the dump control 18 is activated the hydraulic lift cylinder 14 fills and extends thereby lifting the carrying and dumping receptacle 12 upwardly and tilting it outwardly thereby dumping its contents. For transport of materials in the dumping container 12, the dump control 18 is deactivated, the hydraulic lift cylinder 14 is emptied and retracted, and the dumping container is lowered to a position where it is parallel to the ground.

Both the carrying and dumping receptacle 12 and the hydraulic lift cylinder 14 are removable for carrying other loads such as lumber, bagged materials or other materials which are more easily handled without the dumping receptacle 12. These materials would be laid across the rigid frame 36 during transport. Removal of the pins 41 releases the dumping receptacle 12 from the frame 36. While removal of the pin 42 releases the hydraulic cylinder from the lift cylinder pocket 15.

In use, the engine 28 is started and the fan 34 begins to turn. As the fan 34 draws air into the unit 10 the air cushion skirt 40 fills thereby providing a cushion of air below the carrying and dumping receptacle 12. In one embodiment the user stands behind the unit 10, and manually propels and steers the unit 10 by the handle 24. In a second embodiment, the thrust control 27 and thrust tubes 32 act to move the hovercraft load transport assembly 10 over the ground. The air cushion can protect the ground from tracks and troughs created by the wheels of a typical wheel barrow or allow transport over surfaces such as water, marshlands, snow and ice not normally capable with a traditional wheel barrow.

Although the present invention has been described in particular detail with regard to certain preferred versions, other versions are possible. For example, other means to lift the dumping container 12 may be employed such as a manual lift system, a racheted jack lift system, or other lift systems well known in the art. Therefore, the scope and spirit of the appended claims should not be limited by the description of the preferred version.

What is claimed is:

1. A hovercraft load transport system, comprising:

a frame structure;

a flexible skirt coupled to said frame structure;

a fan means coupled to said frame structure for drawing air into said flexible skirt;

power means for driving said fan means;

load carrying means coupled to said frame structure;

hydraulic means for lifting said load carrying means, coupled with said load carrying means and said rigid frame, said hydraulic means including a hydraulic lift cylinder, a hydraulic reservoir coupled to said hydraulic lift cylinder and an electric switch for electrically activating said hydraulic cylinder.

2. A hovercraft load transport system as recited in claim 1, further comprising thrust means for propelling said rigid frame.

3. A hovercraft load transport system as recited in claim 2 wherein said thrust means comprises a pair of thrust tubes fitting through said frame structure and a thrust control.

4. A hovercraft load transport system as recited in claim 1 wherein said fan means is an impeller fan.

5. A hovercraft load transport system as recited in claim 1 wherein said fan means is a propeller fan.

6. A hovercraft load transport system as recited in claim 1 wherein said power means is an engine having a throttle control.

7. A hovercraft load transport system as recited in claim 1, wherein said load carrying means is a carrying and dumping receptacle which is pivotally attached to said rigid frame.

8. A hovercraft load transport system as recited in claim 1 wherein said hydraulic means and said load carrying means are removable.

9. A hovercraft load transport system, comprising:

a frame structure;

a flexible skirt coupled to said frame structure;

a fan means coupled to said frame structure for drawing air into said flexible skirt;

power means for driving said fan means;

load carrying means coupled to said frame structure;

hydraulic means for lifting said load carrying means, coupled with said load carrying means and said rigid frame, wherein said hydraulic means is a hydraulic lift cylinder, a hydraulic reservoir coupled top said hydraulic lift cylinder and a hand pump for manually activating said hydraulic cylinder.

\* \* \* \* \*